United States Patent
Kojima et al.

(10) Patent No.: US 10,693,167 B2
(45) Date of Patent: Jun. 23, 2020

(54) METHOD OF AND APPARATUS FOR EVALUATING MEMBRANE THICKNESS OF ELECTROLYTE MEMBRANE

(71) Applicant: HONDA MOTOR CO., LTD., Minato-ku, Tokyo (JP)

(72) Inventors: Shinya Kojima, Wako (JP); Hiroaki Kawanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 15/823,835

(22) Filed: Nov. 28, 2017

(65) Prior Publication Data

US 2018/0159161 A1  Jun. 7, 2018

(30) Foreign Application Priority Data

Dec. 2, 2016  (JP) .................................. 2016-234860

(51) Int. Cl.
  *H01M 8/1004*  (2016.01)
  *H01M 8/1067*  (2016.01)

(52) U.S. Cl.
  CPC ....... *H01M 8/1004* (2013.01); *H01M 8/1067* (2013.01)

(58) Field of Classification Search
  CPC .................................................. H01L 21/67253
  See application file for complete search history.

(56) References Cited

U.S. PATENT DOCUMENTS

2010/0297530 A1* 11/2010 Isomura ............... H01M 8/1011
                                                    429/492
2015/0219728 A1*  8/2015 Pei .................... H01M 8/04552
                                                     702/65

FOREIGN PATENT DOCUMENTS

| JP | 2003-217342 | 7/2003 |
| JP | 2005-056583 | 3/2005 |
| JP | 2007-087853 | 4/2007 |

* cited by examiner

*Primary Examiner* — Haroon S. Sheikh
(74) *Attorney, Agent, or Firm* — Amin, Turocy & Watson, LLP

(57) ABSTRACT

A membrane thickness evaluation apparatus includes a first voltage application electrode and a second voltage application electrode. A membrane electrode assembly is interposed between the first voltage application electrode and a second voltage application electrode. Alternating current voltage is applied to the membrane electrode assembly to measure the impedance of an electrolyte membrane, and electrostatic capacitance is calculated from the impedance. The electrostatic capacitance is compared with the correlation with the membrane thickness to determine the membrane thickness of the electrolyte membrane.

9 Claims, 3 Drawing Sheets

METHOD OF AND APPARATUS FOR EVALUATING MEMBRANE THICKNESS OF ELECTROLYTE MEMBRANE

CROSS-REFERENCE TO RELATED APPLICATION

This application is based upon and claims the benefit of priority from Japanese Patent Application No. 2016-234860 filed on Dec. 2, 2016, the contents of which are incorporated herein by reference.

BACKGROUND OF THE INVENTION

Field of the Invention

The present invention relates to a membrane thickness evaluation method for evaluating the membrane thickness of an electrolyte membrane of a membrane electrode assembly for use in a fuel cell. Further, the present invention relates to an apparatus for the membrane thickness evaluation method.

Description of the Related Art

A fuel cell includes a membrane electrode assembly that includes an anode, a cathode, and an electrolyte membrane interposed between the anode and the cathode, the electrolyte membrane being made from solid polymer having proton conductivity. As described in Japanese Laid-Open Patent Publication No. 2003-217342 (in particular, see paragraph [0031]), Japanese Laid-Open Patent Publication No. 2005-056583 (in particular, see paragraph [0052]), and Japanese Laid-Open Patent Publication No. 2007-087853 (in particular, see paragraph [0022]), for measurement of the membrane thickness of the electrolyte membrane, a membrane thickness meter, a scanning electron microscope (SEM), an electron probe micro analyzer (EPMA), etc. are used.

In general, the measurement method of this type is a destructive inspection. Therefore, the sample used in the measurement cannot be used for power generation. Therefore, when the sample and the electrolyte membrane which is used actually for power generation are cut out from the same base membrane material, the membrane thickness of the electrolyte membrane is evaluated assuming that the membrane thickness is constant over the entire base membrane material.

SUMMARY OF THE INVENTION

In some cases, it is expected that the membrane thickness may differ depending on the position of the base membrane material. That is, even if both of the sample and the electrolyte membrane are cut out from the same base membrane material, the membrane thickness of the sample and the membrane thickness of the electrolyte membrane may be different from each other. In this case, it cannot be said that the membrane thickness of the electrolyte membrane has been evaluated accurately.

A general object of the present invention is to provide a membrane thickness evaluation method of evaluating the membrane thickness of an electrolyte membrane, the method being a non-destructive inspection.

A main object of the present invention is to provide a membrane thickness evaluation method of accurately evaluating the membrane thickness of an electrolyte membrane that is actually used for power generation.

Another object of the present invention is to provide an electrolyte membrane's membrane thickness evaluation apparatus for carrying out the membrane thickness evaluation method above.

According to an embodiment of the present invention, a membrane thickness evaluation method of evaluating a membrane thickness of an electrolyte membrane in a membrane electrode assembly for a fuel cell is provided. The membrane electrode assembly includes an anode, a cathode, and an electrolyte membrane of solid polymer interposed between the anode and the cathode.

The method includes the steps of measuring impedance of the electrolyte membrane by applying alternating voltage between a first voltage application electrode and a second voltage application electrode electrically connected to the anode and the cathode, respectively, and evaluating the membrane thickness by determining the membrane thickness of the electrolyte membrane from the correlation between the membrane thickness and electrostatic capacitance calculated from the impedance and from the electrostatic capacitance determined in the measuring step.

That is, this membrane thickness evaluation method is carried out as a non-destructive inspection. Therefore, it is possible to install and use in the fuel cell the electrolyte membrane for which the membrane thickness has been determined. Further, it is possible to accurately and simply evaluate the membrane thickness based on the correlation. As a result, in the membrane thickness evaluation method, it is possible to accurately determine the membrane thickness of the electrolyte membrane which is actually used.

For example, the correlation is determined based on the calibration curve. In this regard, when the quantity of water (water content) absorbed inside the electrolyte membrane changes, the membrane thickness and the permittivity of the electrolyte membrane also change. Therefore, there is a concern that the evaluation accuracy of evaluating the membrane thickness is degraded. In order to solve the problem, preferably, the calibration curve is created at predetermined humidity, and in the measuring step, the impedance is measured at humidity corresponding to the humidity when the calibration curve was created. It should be noted that a map indicating correlation between the electrostatic capacitance and the membrane thickness at different humidity may be created.

If the humidity is constant, the water content in the electrolyte membrane is constant. Therefore, since the change in the water content is avoided by setting the humidity as described above, the change in the membrane thickness and the permittivity of the electrolyte membrane is avoided. Thus, it becomes possible to accurately determine not only the impedance but also the membrane thickness of the electrolyte membrane.

Alternating current voltage may be applied to a plurality of positions of the membrane electrode assembly to determine the membrane thickness at the plurality of positions. In this manner, it is possible to measure the membrane thickness distribution on the electrode surface, and evaluate the degree of variation in the membrane thickness of the electrolyte membrane.

According to another embodiment of the present invention, a membrane thickness evaluation apparatus for evaluating a membrane thickness of an electrolyte membrane in a membrane electrode assembly for a fuel cell is provided. The membrane electrode assembly includes an anode, a cathode, and an electrolyte membrane of solid polymer interposed between the anode and the cathode.

The apparatus includes a first voltage application electrode and a second voltage application electrode electrically connected to the anode and the cathode, respectively, an alternating current voltage source for applying alternating voltage between the first voltage application electrode and the second voltage application electrode, a membrane thickness evaluation unit for determining the membrane thickness of the electrolyte membrane from the correlation between electrostatic capacitance and the membrane thickness, and from the electrostatic capacitance determined by application of the alternating current voltage, and a display unit for displaying the membrane thickness determined by the membrane thickness evaluation unit.

In the structure, the impedance of the electrolyte membrane is determined first, and thereafter, the entire process until determination of the membrane thickness based on the electrostatic capacitance calculated from this impedance can be performed without machining the membrane electrode assembly. That is, the membrane thickness evaluation can be performed as a non-destructive inspection. Therefore, it becomes possible to install and actually use in the fuel cell the electrolyte membrane for which the membrane thickness has been evaluated.

In the case of determining correlation based on the calibration curve, preferably, the impedance is measured at humidity corresponding to the humidity when the calibration curve was created. For this purpose, the first voltage application electrode and the second voltage application electrode are placed in the constant humidity bath, and the impedance is measured in the constant humidity bath. In the middle of measurement, the constant humidity bath is controlled in a manner that the humidity in the constant humidity bath is kept substantially at a constant level. In this manner, since the change in the membrane thickness of the electrolyte membrane and the electrostatic capacitance is avoided, it is possible to measure the impedance accurately. Further, it becomes possible to evaluate the membrane thickness accurately.

Further, in order to measure the impedance of the electrolyte membrane at a plurality of positions, for example, at least one of the first voltage application electrode and the second voltage application electrode is divided in a lattice pattern. In this case, each of the voltage application electrodes divided in the lattice pattern contacts the anode or the cathode. Normally, electric current flows only at the position where the electrolyte membrane contacts the voltage application electrode. Therefore, the impedance is obtained at each position where the electrolyte membrane contacts the voltage application electrode. Therefore, it is possible to measure the membrane thickness distribution on the electrode surface, and evaluate the membrane thickness of the electrolyte membrane at a plurality of positions.

In the present invention, the impedance of the electrolyte membrane is determined, and the electrostatic capacitance calculated from the impedance is compared with the predetermined correlation (e.g., calibration curve) to determine the membrane thickness of the electrolyte membrane. Therefore, it is possible to evaluate the membrane thickness accurately and simply.

Further, the above process, i.e., the membrane thickness evaluation can be performed as a non-destructive inspection. Therefore, it is possible to install and actually use in the fuel cell the electrolyte membrane for which the membrane thickness has been evaluated. That is, it is possible to accurately determine the membrane thickness of the electrolyte membrane which is actually used.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a membrane thickness evaluation method of evaluating the membrane thickness of an electrolyte membrane according to the present invention will be described in detail with reference to the accompanying drawings, by providing an embodiment which is preferable in relation to a membrane thickness evaluation apparatus for carrying out the membrane thickness evaluation method.

Figure 1:
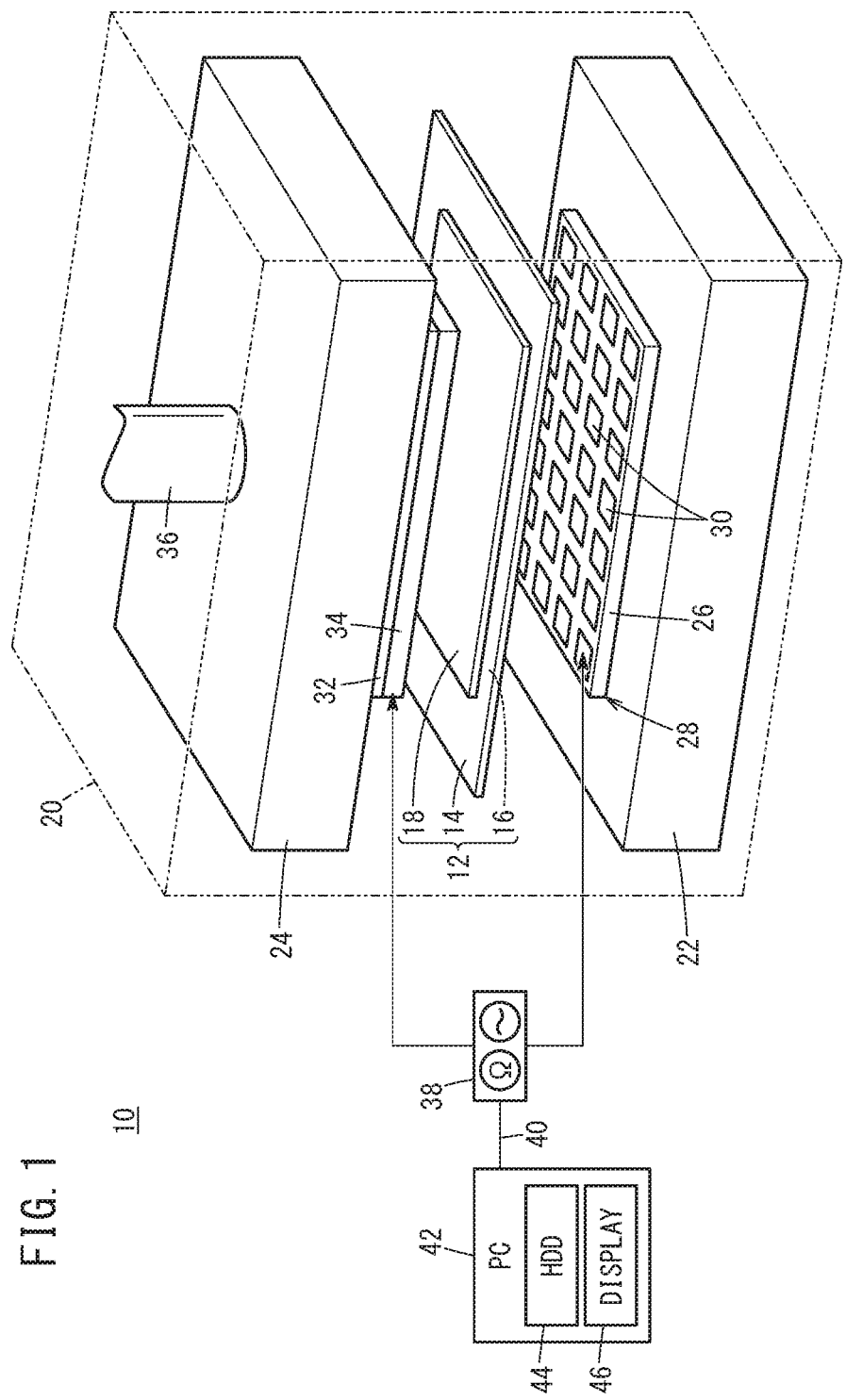
FIG. 1 is a perspective view schematically showing main components of a membrane thickness evaluation apparatus according to an embodiment of the present invention.
Figure 2:
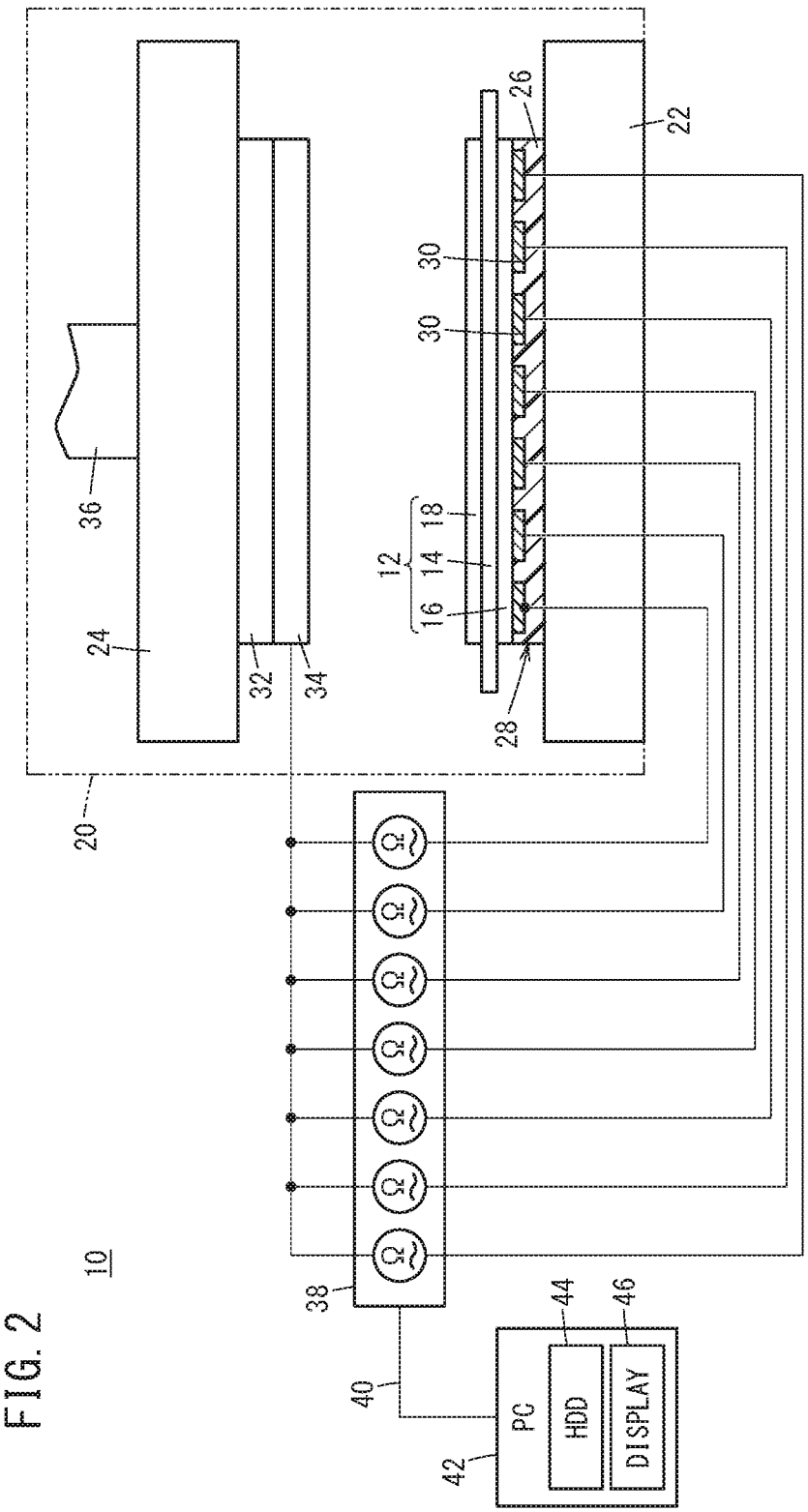
FIG. 2 is a side view schematically showing main components of a membrane thickness evaluation apparatus in FIG. 1.

FIGS. 1 and 2 are a perspective view and a side view, respectively, schematically showing main components of a membrane thickness evaluation apparatus 10 according to the embodiment of the present invention. The membrane thickness evaluation apparatus 10 is used for evaluating the membrane thickness of a solid polymer electrolyte membrane 14 of a membrane electrode assembly 12 of a unit cell of a fuel cell. Hereinafter, the solid polymer electrolyte membrane 14 is also simply referred to as the "electrolyte membrane 14".

The membrane electrode assembly 12 will be described below briefly. The membrane electrode assembly 12 includes an anode 16, a cathode 18, and the electrolyte membrane 14 interposed between the anode 16 and the cathode 18. The electrolyte membrane 14 is made from solid polymer having proton conductivity. Examples of solid polymer of this type include perfluorosulfonic acid. However, the present invention is not limited to perfluorosulfonic acid.

Each of the anode 16 and the cathode 18 includes a gas diffusion layer and an electrode catalyst layer interposed between the gas diffusion layer and the electrolyte membrane 14. Reactant gases are supplied to the gas diffusion layers. The reactant gases supplied from the gas diffusion layers induce electrode reactions at the electrode catalyst layers. The above structure is known in the art. Therefore, the gas diffusion layers and the electrode catalyst layers are not shown, and the detailed description thereof is omitted.

In FIGS. 1 and 2, though the anode 16 faces the lower side and the cathode 18 faces the upper side, the cathode 18 may, conversely, face the lower side and the anode 16 may face the upper side.

The membrane thickness evaluation apparatus 10 includes a constant humidity bath 20 having an open/close door (not shown), and a lower die 22 (first die) and an upper die 24 (second die) placed inside the constant humidity bath 20. The lower die 22 is fixedly positioned and stationary inside the constant humidity bath 20. The upper die 24 can be displaced in a direction closer to, or away from the lower die 22 in the constant humidity bath 20. Stated otherwise, the upper die 24 can be elevated/lowered. The constant humidity bath 20 is controlled in a manner that the humidity inside the constant humidity bath 20 is kept at a constant level.

A first voltage application electrode 28 is provided at an upper end surface of the lower die 22 facing the upper die 24, through an insulating membrane 26. The first voltage application electrode 28 is divided in a lattice pattern by the insulating membrane 26. That is, the first voltage application electrode 28 comprises a plurality of divided electrodes 30. In the structure, each of the divided electrodes 30 contacts the gas diffusion layer of the anode 16.

A second voltage application electrode 34 in the form of a flat plate is provided at a lower end surface of the upper die 24 facing the lower die 22, through an insulating membrane 32. The upper die 24 is attached to an elevation mechanism (not shown) (e.g., cylinder, etc.) through a rod 36 provided at an upper end surface of the upper die 24. The upper die 24 is elevated and lowered under operation of the elevation mechanism. An insertion hole (not shown) is formed in the constant humidity bath 20, and the rod 36 is inserted slidably into the insertion hole. Further, a seal member (not shown) is provided for sealing space between the rod 36 and the insertion hole.

As schematically shown in FIGS. 1 and 2, the first voltage application electrode 28 (individual divided electrodes 30) and the second voltage application electrode 34 are electrically connected to an impedance measurement instrument 38 for measuring the impedance of the electrolyte membrane 14. The impedance measurement instrument 38 also functions as an alternating current power source for applying the alternating current voltage.

The impedance measurement instrument 38 is electrically connected to the individual divided electrodes 30 (see FIG. 2). Therefore, the impedance measurement instrument 38 can obtain information regarding the impedance from each of the divided electrodes 30.

A computer 42 is connected to the impedance measurement instrument 38 through a cable 40. The computer 42 includes a hard disk drive 44 as a storage medium configured to have software (computation unit) which functions as a membrane thickness evaluation unit, and a display 46 (display unit) for displaying a membrane thickness evaluation result described later. In FIGS. 1 and 2, the computer is denoted by "PC", and the hard disk drive is denoted by "HDD".

Figure 3:
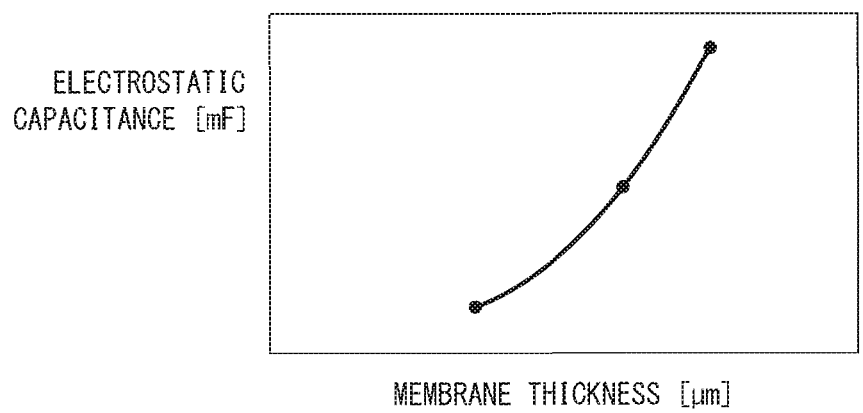
FIG. 3 is a graph showing the correlation (calibration curve) between the membrane thickness and the electrostatic capacitance stored in a hard disk drive (membrane thickness evaluation unit) shown in FIGS. 1 and 2.

The hard disk drive 44 stores a calibration curve shown in FIG. 3 as information. As described later, the calibration curve is created based on the electrostatic capacitance calculated from the impedance measured under a predetermined humidity environment for a sample membrane that has a predetermined membrane thickness and is made of the same material as the electrolyte membrane 14.

The membrane thickness evaluation apparatus 10 according to the embodiment of the present invention basically has the above structure. Next, operation and advantages of the membrane thickness evaluation apparatus 10 will be described in relation to the method of evaluating the membrane thickness according to the embodiment of the present invention.

Firstly, the above calibration curve is created. Specifically, in the constant humidity bath 20 where the humidity of the atmosphere is kept at a constant level, the impedance of the sample membrane having a predetermined (known) membrane thickness is measured. Further, the electrostatic capacitance is calculated from this impedance, and the relationship between the membrane thickness and the electrostatic capacitance is determined.

Then, the sample membrane is replaced with other sample membranes each having a different membrane thickness. Each time the sample membrane is replaced, the impedance is measured and the electrostatic capacitance is calculated. As a result, the calibration curve (see FIG. 3) showing the correlation between the membrane thickness and the electrostatic capacitance under the current humidity environment is obtained. The hard disk drive 44 stores information regarding the calibration curve obtained in this manner.

For example, the membrane thickness of the sample membrane may be measured by the membrane thickness meter, etc. In the case where the membrane thickness is evaluated by a destructive inspection, the impedance is measured before evaluation of the membrane thickness.

Next, the anode 16 is formed on one end surface of the electrolyte membrane 14 which is made of the same solid polymer as the sample membrane but has an unknown thickness, and the cathode 18 is formed on the other end surface to produce the membrane electrode assembly 12. Further, in order to carry out the measuring step, the open/close door of the constant humidity bath 20 is opened, and for example, the anode 16 of the membrane electrode assembly 12 is placed on the lower die 22, and the cathode 18 is provided to face the upper die 24. At this time, as shown in FIG. 2, each of the divided electrodes 30 contacts the gas diffusion layer of the anode 16.

Thereafter, the open/close door is closed, and the humidity inside the constant humidity bath 20 is regulated at the humidity when the impedance of the sample membrane was measured (electrostatic capacitance was measured). The constant humidity bath 20 is controlled such that the humidity in the constant humidity bath 20 is kept substantially at a constant level equal to the regulated humidity.

Next, the elevation mechanism is driven to move forward the rod 36 so as to lower the upper die 24 toward the lower die 22. As a result, the second voltage application electrode 34 contacts the cathode 18.

In this state, the alternating current voltage is applied from the impedance measurement instrument 38 to the first voltage application electrode 28 and the second voltage application electrode 34. By this voltage application, the first voltage application electrode 28 and the second voltage application electrode 34 are energized through the membrane electrode assembly 12. Since the anode 16 and the cathode 18 are electric conductors, it is possible to determine the impedance of the electrolyte membrane 14 which is a dielectric substance. Since the insulating membrane 26 is interposed between the first voltage application electrode 28 and the lower die 22, and the insulating membrane 32 is interposed between the second voltage application electrode 34 and the upper die 24, no electrical current flows through the lower die 22 and the upper die 24.

In this regard, the first voltage application electrode 28 is made up of the plurality of divided electrodes 30 that are insulated from each other by the insulating membrane 26. Therefore, the electric current flows between the individual divided electrodes 30 and the second voltage application electrode 34. Stated otherwise, the electric current flows through only the positions where the anode 16 contacts the divided electrodes 30. As described above, the impedance measurement instrument 38 is electrically connected to each of the divided electrodes 30. In the structure, it is possible to read the impedance at the position where the anode 16 contacts each of the divided electrodes 30.

Next, the computer 42 performs the step of evaluating the membrane thickness. Specifically, the value of the impedance measured by the impedance measurement instrument 38 is transmitted in the form of information signals to the computer 42 through a cable 40. The computation unit stored in the hard disk drive 44 of the computer 42 calculates the electrostatic capacitance from the impedance. Further, a value of the electrostatic capacitance is compared with the calibration curve (FIG. 3), and the membrane thickness at the position where each of the divided electrodes 30 contacts the anode 20 is determined individually. In this manner, the membrane thickness at each position of the electrolyte membrane 14 is determined.

The membrane thickness determined in the manner as described above is displayed on the display 46. As described above, in the embodiment of the present invention, the calibration curve (relationship between the membrane thickness and the electrostatic capacitance) is created in advance, and the electrostatic capacitance determined by applying the alternating current voltage to the electrolyte membrane 14 which is actually used is compared with the calibration curve. In this manner, it becomes possible to evaluate the membrane thickness at each position of the electrolyte membrane 14. That is, for example, it is possible to evaluate the degree of variation in the membrane thickness of the electrolyte membrane 14. As necessary, the computation unit stored in the hard disk drive 44 may calculate the average value, the standard deviation, etc., and the display 46 may display the results of the calculation together.

When the water content in the electrolyte membrane 14 changes, the membrane thickness and the permittivity of the electrolyte membrane 14 change as well. However, in the embodiment of the present invention, the constant humidity bath 20 is used and the impedance is measured under the environment where the humidity of the atmosphere is kept substantially at a constant level. Under the constant humidity environment, the water content in the electrolyte membrane 14 is substantially constant. Therefore, the change in the membrane thickness and the permittivity of the electrolyte membrane 14 is avoided. Thus, it is possible to evaluate the membrane thickness accurately based on the calibration curve.

Further, in the embodiment of the present invention, the alternating current voltage is applied to the membrane electrode assembly 12 to determine the membrane thickness. That is, a non-destructive instruction is performed. Therefore, a unit cell is formed using the membrane electrode assembly 12 for which the membrane thickness of the electrolyte membrane 14 has been evaluated, and a plurality of the unit cells are stacked together to form the fuel cell for use in power generation. In summary, it is possible to accurately evaluate the membrane thickness of the electrolyte membrane 14 which is actually used.

The present invention is not limited to the above described embodiment specially. Various modifications can be made without departing from the gist of the present invention.

For example, after the fuel cell having the membrane electrode assembly 12 including the electrolyte membrane 14, the first voltage application electrode 28, and the second voltage application electrode 34 is produced, the membrane thickness may be evaluated when operation of the fuel cell is stopped or when the fuel cell is operated. In this case, the lower die 22 and the upper die 24 are not required.

Further, at the time of creating the calibration curve using the sample membrane, the humidity may be changed to various humidity levels, and the impedance and the electrostatic capacitance may be determined at each humidity level. Information regarding the obtained calibration curve as a map may be stored for each humidity level in the hard disk drive 44. Then, at the time of measuring the impedance of the electrolyte membrane 14, the humidity of the atmosphere is measured, and the humidity and information related to the humidity are transmitted to the computer 42.

The computer 42 reads out the calibration curve and/or the map of the humidity corresponding to the humidity of the atmosphere, and compares the calculated electrostatic capacitance with the calibration curve to determine the membrane thickness of the electrolyte membrane 14. Also in this manner, it is possible to evaluate the membrane thickness of the electrolyte membrane 14. Therefore, in this case, the constant humidity bath 20 is not required.

Further, the first voltage application electrode 28 may be in the form of a flat plate, and the second voltage application electrode 34 may be made up of divided electrodes 30. Further, both of the first voltage application electrode 28 and the second voltage application electrode 34 may be made up of the divided electrodes 30.

What is claimed is:

1. A membrane thickness evaluation method of evaluating a membrane thickness of an electrolyte membrane in a membrane electrode assembly for a fuel cell, the membrane electrode assembly including an anode, a cathode, and an electrolyte membrane of solid polymer interposed between the anode and the cathode, the method comprising the steps of:

measuring impedance of the electrolyte membrane by applying alternating current voltage between a first voltage application electrode and a second voltage application electrode electrically connected to the anode and the cathode, respectively; and determining the membrane thickness of the electrolyte membrane from the correlation between the membrane thickness and electrostatic capacitance calculated from the impedance, and from the electrostatic capacitance determined in the measuring step, wherein the correlation is determined based on a calibration curve created at predetermined humidity, and in the measuring step, the impedance is measured at humidity corresponding to the humidity when the calibration curve was created.

2. The membrane thickness evaluation method according to claim 1, wherein the measuring step is performed in a constant humidity bath where the humidity is controlled.

3. The membrane thickness evaluation method according to claim 2, wherein the measuring step is performed in a state where a first die that is equipped with the first voltage application electrode and a second die that is equipped with the second voltage application electrode and configured to move closer to or away from the first die relatively are provided in the constant humidity bath and the membrane electrode assembly is held between the first die and the second die.

4. The membrane thickness evaluation method according to claim 1, wherein the calibration curve is created at various humidity levels and the thickness of the electrolyte membrane is determined from the calibration curve created at the same humidity as the humidity when the measuring step was performed.

5. The membrane thickness evaluation method according to claim 1, wherein alternating current voltage is applied to a plurality of positions of the membrane electrode assembly to determine the membrane thickness at the plurality of positions.

6. A membrane thickness evaluation apparatus for evaluating a membrane thickness of an electrolyte membrane in a membrane electrode assembly for a fuel cell, the membrane electrode assembly including an anode, a cathode, and an electrolyte membrane of solid polymer interposed between the anode and the cathode, the apparatus comprising:
a first voltage application electrode and a second voltage application electrode electrically connected to the anode and the cathode, respectively;
a constant humidity bath configured to accommodate the first voltage application electrode and the second voltage application electrode;
an alternating current voltage source configured to apply alternating current voltage between the first voltage application electrode and the second voltage application electrode;
a membrane thickness evaluation unit, comprising a hard disk drive as a storage medium, configured to determine the membrane thickness of the electrolyte membrane from correlation between electrostatic capacitance and the membrane thickness, and from the electrostatic capacitance determined by application of the alternating current voltage; and
a display unit configured to display the membrane thickness determined by the membrane thickness evaluation unit.

7. The membrane thickness evaluation apparatus according to claim 6, further comprising a first die and a second die provided in the constant humidity bath and configured to hold the membrane electrode assembly therebetween; and
the first voltage application electrode is provided in the first die through an insulating membrane and the second voltage application electrode is provided in the second die through an insulating membrane.

8. The membrane thickness evaluation apparatus according to claim 6, wherein the membrane thickness evaluation unit is a computation unit configured to store a calibration curve created at various humidity levels, and configured to determine the thickness of the electrolyte membrane from the calibration curve created at the same humidity as the humidity when alternating current voltage is applied between the first voltage application electrode and the second voltage application electrode.

9. The membrane thickness evaluation apparatus according to claim 6, wherein at least one of the first voltage application electrode and the second voltage application electrode is divided in a lattice pattern.

* * * * *